(No Model.) 4 Sheets—Sheet 1.

W. L. CARD.
SEPARATOR.

No. 448,472. Patented Mar. 17, 1891.

Attest:
E. D. Walker
G. W. Tauberschmidt

Inventor:
William L. Card
by F. W. Ritter Jr.
Atty

(No Model.) 4 Sheets—Sheet 2.

W. L. CARD.
SEPARATOR.

No. 448,472. Patented Mar. 17, 1891.

Attest:
E. D. Waeken
G. A. Tauberschmidt

Inventor:
William L. Card
by F. W. Ritter Jr.
Atty

THE NORRIS PETERS CO., PHOTO-LITHO., WASHINGTON, D. C.

(No Model.) 4 Sheets—Sheet 3.

W. L. CARD.
SEPARATOR.

No. 448,472. Patented Mar. 17, 1891.

Attest:
E. S. Walker
J. A. Tauberschmidt

Inventor.
William L. Card.
by F. W. Ritter Jr
Atty (No Model.) 4 Sheets—Sheet 4.
W. L. CARD.
SEPARATOR.

No. 448,472. Patented Mar. 17, 1891.

UNITED STATES PATENT OFFICE.

WILLIAM L. CARD, OF LA CROSSE, WISCONSIN, ASSIGNOR TO THE CARD CONCENTRATOR COMPANY, OF COLORADO.

SEPARATOR.

SPECIFICATION forming part of Letters Patent No. 448,472, dated March 17, 1891.

Application filed July 2, 1890. Serial No. 357,502. (No model.)

*To all whom it may concern:*

Be it known that I, WILLIAM L. CARD, a citizen of the United States, residing at La Crosse, in the county of La Crosse and State of Wisconsin, have invented certain new and useful Improvements in Concentrators; and I hereby declare the following to be a full, clear, and exact description of the same, reference being had to the accompanying drawings, wherein—

Like symbols refer to like parts wherever they occur.

The object aimed at in concentration is the production of concentrates containing no gangue matter and tailings containing no concentrates or mineral. The best results heretofore attained have been the saving on an average of seventy-five (75) per cent. of the value contained in the ore.

My machine is based upon the discovery of a method for using a large volume of air at great velocity for a brief interval of time and means by which the volume, the velocity, and the interval may be modified or adjusted. This discovery, as applied in the present machine, enables the operator to produce the same results with air weighing only .075,291 of a pound to the cubic foot, as has heretofore been produced with water, a cubic foot of which weigh 62.5 pounds.

Previous machines by which the attempt to use air instead of water has been made have lacked suitable means for producing air-impulses having a proper volume, velocity, and interval of time to exactly meet the requirements due to size, specific gravity, and shape or form of the particles composing the mass of ore under treatment.

The object aimed at by me is by reason of the adjustment of the machine the production of perfect stratification of any ore capable of stratification throughout a very wide range of sizes, thus avoiding the necessity of using one style of machine (as, for instance, a jig) for coarse material and another style of machine (as, for instance, a percussion-table, a buddle, or a vanner) for fine material.

To effect these results I have combined with an ore-bed whereon stratification can take place a bellows (or its equivalent a chamber having a diaphragm) for producing air-currents of any required volume, and a beater for producing the impulse or intermittent current, and the latter element or beater I have provided with adjuncts, whereby the character of the blow may be modified to produce an endless variation in the character of the impulse, and the principles of construction embodies the first feature of my invention. Secondly, experiments have shown me that the machine for sorting or dividing the metal or mineral from the gangue or refuse should not only be so constructed and operated as to divide the valuable and worthless particles of the mass into different strata, but should also separate and discharge the various strata at different places, and that in thus withdrawing the substratum it should be done without opening a way for the discharge of the stratifying agent (air or water) and with it the gangue. To effect this I provide a compound ore-bed with one or more discharge slots, ways, or conduits, which is (or are) kept full of concentrates, maintaining thereby as much resistance (or more) to the flow of the stratifying-fluid in that direction as is presented by the mass on the ore-bed, and, further, by providing means for rendering the discharge as well as the stratifying force intermittent in its action, and said principle of construction embodies a second feature of my invention.

There are other minor features of invention, all as will hereinafter more fully appear.

I will now proceed to describe more specifically the mechanism which I have devised for the purpose of conducting the operation of concentrating ores in accordance with the principles hereinbefore set forth, in order that others skilled in the art to which it appertains may apply the invention either in the exact form chosen for illustration or with such modifications as particular circumstances may require. This machine consists of four principal parts or divisions, as follows: first, a bellows (or chamber having a diaphragm) operated by, second, a beater susceptible of adjustment to produce an endless variety of impulses through, third, the ore-bed on which the desired stratification is produced thereby, having discharge-openings for concentrates which laterally and vertically divide the ore-bed into compartments longitudinally of the same, and, fourth, mechanism for (slowly and properly) removing the concentrates from the bed as fast as they are precipitated, (or stratified,) leaving the gangue thus deprived of its mineral constituents to flow off at the tail of the machine. Other parts coacting with these will be set forth and described in their proper order in connection with the four principal parts.

Figure 1:
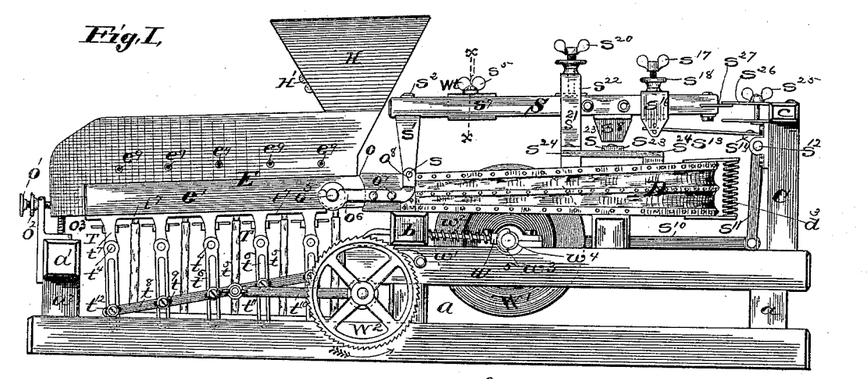
Figure 1 is a side elevation of a concentrator embodying my invention.
Figure 2:
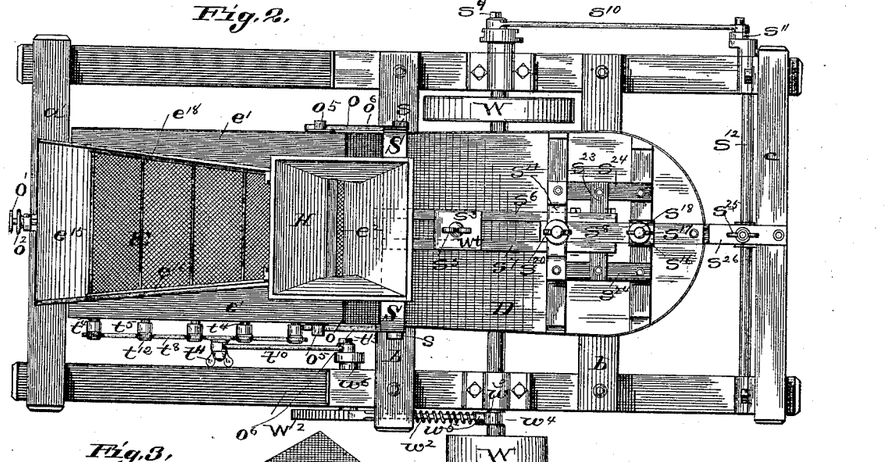
Fig. 2 is a top or plan view.
Figures 5, 6, 7, 8, 9, 10:
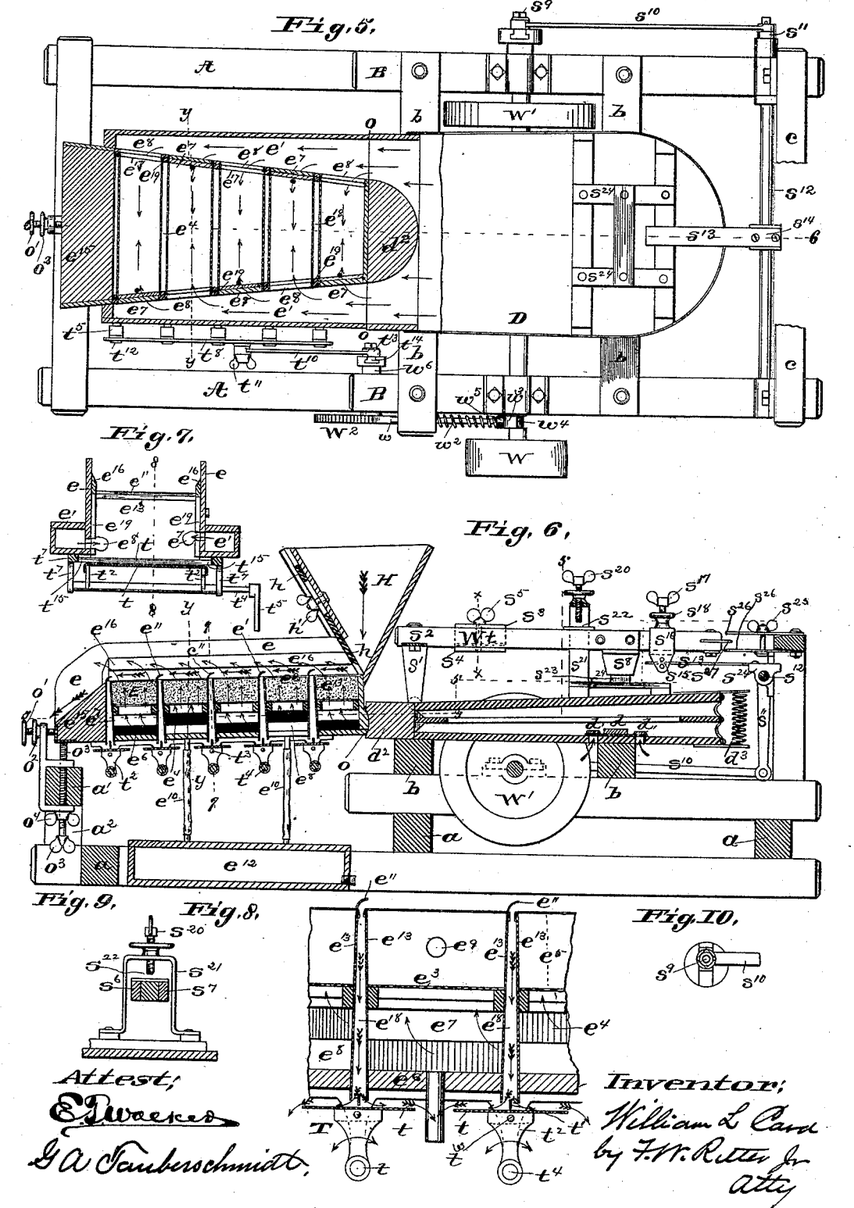
Fig. 5 is a plan view of the devices, partly in horizontal section, and with the beater removed to show the elastic anvil on the top of the bellows.
Fig. 6 is a longitudinal sectional elevation on the line 6 6, Fig. 5.
Fig. 7 is a vertical transverse section on the line 7 7, Fig. 6.
Fig. 8 is an enlarged vertical longitudinal section of a portion of the compound ore-bed, to more clearly illustrate the construction of the concentrator-boxes and the intermediate discharge-slots for withdrawing the substratum of concentrates and the means for rendering such withdrawal intermittent, so as to maintain the necessary resistance to the flow of fluid in said discharge-slots.
Fig. 9 is a vertical transverse section on part of the line 5 5, Fig. 6, to show the strap $s^{21}$ and thumb-screw $s^{20}$, by which the relation of beater and bellows is controlled.
Fig. 10 is a detached view of one of the adjustable throw-cranks for controlling the action of the beater and ratchet-wheel.
Figure 17:
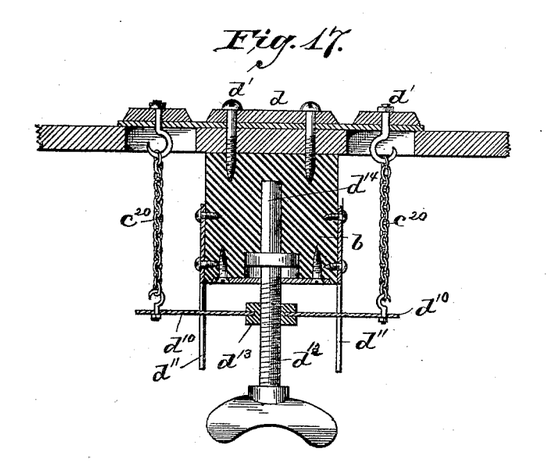
Fig. 17 is a sectional view of a portion of the bottom of the bellows and its valves $d'\ d'$, with means for holding the valves more or less firmly to their seats when a return current is desired.
Figure 18:
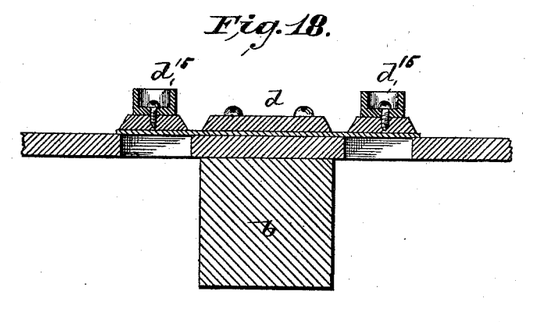
Fig. 18 is a modification of the devices shown in Fig. 17, wherein weights are substituted for springs.

In Figs. 1, 2, 5, and 6, D is a bellows, the lower leaf of which is secured immovably to the cross-timbers $b$ of the frame. The top of the bellows is moved in an upward direction by a contact of the beater device S with the thumb-screw $s^{20}$, said thumb-screw passing through the strap $s^{21}$, which strap is suitably secured at its lower ends to the bellows-cover, and said upward movement is assisted but not compelled by the spring $d^3$. The downward movement of the bellows-top is imparted by a contact of the beater-block $s^8$ with one of the bars $s^{23}$ of an elastic anvil $s^{24}$. (Shown on the top of the bellows in the figures above referred to.) The elastic anvil $s^{24}$ is composed of the cross-bar $s^{23}$, supported by the end bars $s^{24} s^{24}$, the latter being in turn supported at their ends by blocks, the whole constituting an elastic or yielding frame which rests on the top of the bellows, having for its object the modification of the force imparted to the bellows by the blow of the hammer. The bellows has inlet-valves, as shown at $d' d'$, Fig. 6, which should be of sufficient size and freedom of movement to quickly admit a large volume of air to the bellows without creating any perceptible return current through the ore-bed and its superimposed strata of pulverized ore. Should it be desired to produce such a return current, it can be brought about by holding the valves $d' d'$ more or less firmly to their seats by adjustable spring-connections or by weighting the valves, in manner well understood in the art. Devices for this purpose are shown in Fig. 17, wherein the valves $d' d'$ of the bellows are connected by chains $c^{20}$ with the ends of a spring $d^{10}$, movable in guides $d^{11}$, said spring being controlled by an adjusting-screw $d^{12}$, which passes through a nut $d^{13}$ and bears in a block $d^{14}$, secured to the bellows. In lieu of springs the valves $d'$ may be weighted by the weights $d^{15}$. (Shown in Fig. 18.) The curved or semicircular block $d^2$ at the discharge end of the bellows (see Figs. 5 and 6) is to divide and guide the air-currents to the entrances of the conduits $e' e'$ in such manner as to avoid eddies. In order to cause the bellows to produce the greatest possible variety of air-impulses, it is operated by a beater S, supported by the strap $s'$, to which it is secured by bolts $s^2$, said strap being pivoted at $s$. This beater S consists, primarily, of a handle (or parallel bars $s^6 s^7$) and the beater-block $s^8$, properly secured thereto, which acts upon an elastic anvil $s^{23}$ $s^{24} s^{24}$ (see Fig. 2) upon the upper leaf of the bellows D. The beater is actuated by the adjustable throw-crank $s^9$, pitman $s^{10}$, arm $s^{11}$, rock-shafts $s^{12}$, and spring-arm $s^{13}$, secured to block $s^{14}$ on shaft $s^{12}$, and receives its motion through the medium of the adjustable sliding clamp $s^{16}$, arranged on the beater-handle, said clamp having the pins $s^{15}$ inserted in the downwardly-projecting lips, forming a part thereof between which pins the spring-arm $s^{13}$ is inserted, as shown in Figs. 1 and 6.

Figure 13:
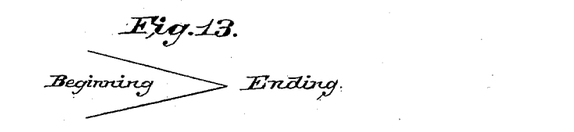
Fig. 13 is a diagram illustrating the character of the impulse due to momentum alone or the blow of the beater directly on the bellows.
Figure 14:
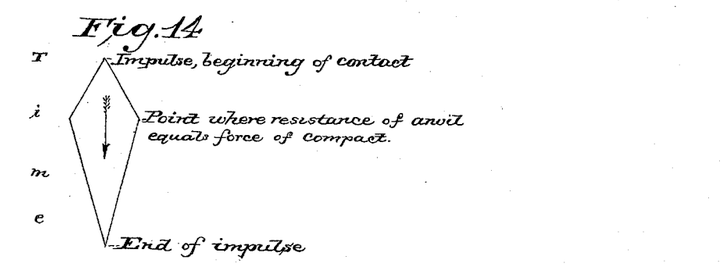
Fig. 14 is a diagram illustrating the character of the impulse due to momentum and yielding resistance or modified by interposing an elastic anvil between the beater and bellows.
Figure 15:
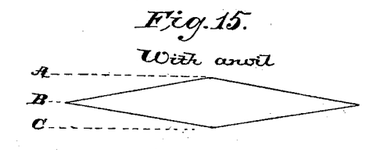
Fig. 15 is a diagram illustrating the force of concussion when an elastic anvil is used.
Figure 16:
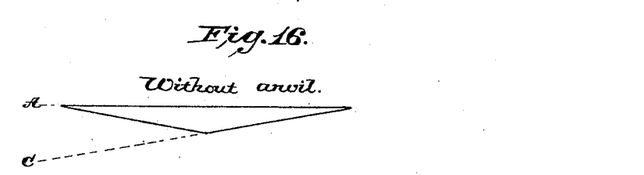
Fig. 16 is a diagram illustrating the force of concussion when an elastic anvil is not used.

I will now proceed to describe those auxiliaries of the beater which enable the operator to impart an almost endless variety of properties to the impulses which pass through the compound ore-bed E from the bellows D, some of which properties are as follows:

First. Momentum, or power of overcoming inertia, as by a weight in motion. For this purpose I provide the handle S of the beater with an adjustable weight $W^t$. The momentum is increased by adjusting the weight $W^t$ nearer the beater-block $s^8$ and diminished by adjusting it farther away from the same. An impulse due to this cause alone would be illustrated by converging lines representing diminution of force and volume. (See diagram Fig. 13.) This force, acting upon the elastic anvil, would so modify the impulse that it would be represented by a quick swell and slow diminuendo, as shown by the diverging and converging line in diagram Fig. 14.

Second. Concussion, or the greatest force for the shortest period of time. This is produced by allowing a free movement to the beater. It is increased by a greater and diminished by a less free movement, and to control the free movement of the beater I employ the strap $s^{21}$ and thumb-screw $s^{20}$, hereinbefore specified, or its equivalent.

In explanation, the bellows is compressed by the contact of the beater-block $s^8$ with the anvil $s^{23}$ and raised or opened by the contact of the beater-handle with the thumb-screw $s^{20}$, (see Figs. 1, 6, and 9,) the free movement of the beater being increased or diminished by increasing or diminishing the space $s^{22}$ between the end of the thumb-screw and the handle (see Figs. 6 and 9) in manner apparent. This force would be represented by the diagrams 15 and 16, the first being the lines where an elastic anvil is used and the second where no anvil is used, A beginning, B middle, and C end of impulse.

The velocity of impulse is modified, first, by changing the throw of the adjustable crank $s^9$; second, by adjusting the sliding clamp $s^{16}$ farther from or nearer to the rock-shaft $s^{12}$, thus causing the beater to have a longer or shorter stroke in the same interval of time, as the case may be; third, by manipulation of the thumb-screw $s^{25}$, which controls the opening or closing of the free ends of the spring-plates $s^{26}$, between which plays the plate $s^{27}$, secured to the beater-handle S, and thus increasing or diminishing its movement by opposing a more or less yielding resistance to its strokes at the ends of said strokes.

The first method—viz., by means of the throw of the crank—is of general utility, while the second and third methods are tributary for purposes of further modifying the impulse.

The volume of impulse is modified by securing the clamp $s^{16}$ at the extreme end of beater-handle, where the spring-arm $s^{13}$ has the least elasticity, and then increasing the throw of the crank $s^9$ will increase the volume and diminishing the crank-throw will diminish it.

*Resistance to impulse.*—This may be modified to almost any required extent after it leaves the bellows and before it acts upon the pulverized ore by the nature, shape, size, and depth of the material (preferably shot) with which the chamber $e^5$ of the ore-bed E is charged, the impulse passing much more freely through coarse or globular than through small or irregular particles, also more freely through a thin than through a thick stratum.

I have in the preceding description described and shown means of imparting at least four different qualities to the impulses and means for modifying each quality in connection with a suitable resistance, and also means for modifying said resistance, so that it is apparent that I have the means at hand for adjusting the machine to handle a great variety of ores.

Figure 3:
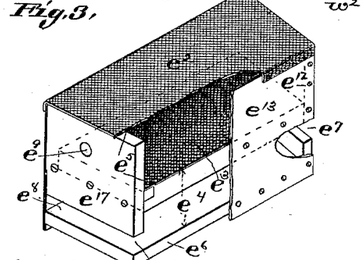
Fig. 3 is a perspective view, partly broken away, of one of the concentrator-boxes or double chambers, a series of which constitute the compound ore-bed.
Figure 4:
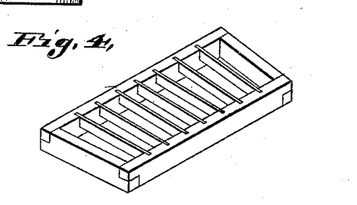
Fig. 4 is a perspective view of one of the diaphragm-frames which divide the concentrator-boxes into upper and lower compartments.
Figure 11:
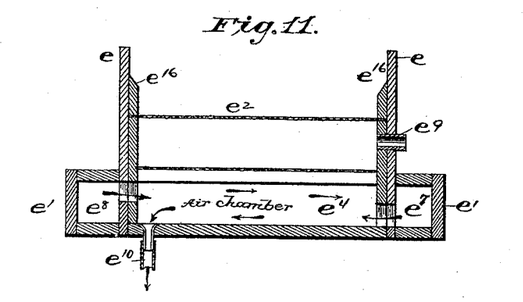
Fig. 11 is a transverse vertical section of one of the double chambers or concentrator-boxes, a series of which constitute the compound ore-bed, taken on the line $y\ y$, Figs. 5 and 6.
Figure 12:
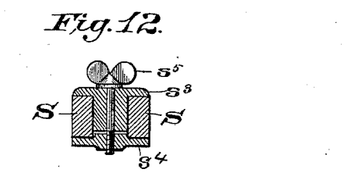
Fig. 12 is a transverse sectional view of the beater-handle and the adjustable momentum weight on the line $x\ x$, Fig. 1.

The third principal part of this device consists of a compound ore-bed having a pervious diaphragm which substantially separates it into two compartments, (the upper to contain some material pervious to air, preferably shot, and the lower for the admission and distribution of air,) and also divided longitudinally by transverse vertical openings into such a number or series of compartments as may be desired. In the drawings I have shown five such double chambers; or, in other words, the compound ore-bed is made up of a series of concentrator-boxes. One of these double chambers or concentrators, of which a series form the compound ore-bed, is shown detached and in perspective in Fig. 3, in which the bottom $e^6$ and the ends $e^{17}$ are made preferably of some suitable wood, the sides $e^{18}$ of some suitable sheet metal, preferably brass, the tops being brought to an edge by a file or on an emery-wheel. To the tops of the sharp edges of the brass side pieces $e^{13}$ the wire-gauze cover $e^2$ is secured (by soldering or in any other suitable manner) after being tightly drawn into place. This gauze is then drawn taut longitudinally and secured (by tacks or in any other suitable manner) to the top edges of the end pieces $e^{17}$. The lower wire-gauze diaphragm $e^3$ is supported upon the frame shown detached in Fig. 4, to which it is secured in any suitable manner. The various parts are put together, as shown in Fig. 3, with screws or in any other suitable manner. Thus are formed a shot-chamber $e^5$ above, having the opening $e^9$ for filling and emptying said chamber, and the air-chamber $e^4$ below, said air-chamber $e^4$ having air-entrance ports $e^7$ above and $e^8$ below at opposite ends of the air-chamber, with the end in view of producing as nearly as may be an equal distribution of the impulses in the lines of the arrows shown on the drawings, Fig. 11, and at all intermediate points, and of sweeping (with the lower current entering at $e^8$) all fine particles which may jig through the bed and fall upon the bottom of the air-chamber to one end and down through the tubes $e^{10}$ into the receptacle $e^{12}$, and at the same time avoiding injurious eddies in the air-chamber $e^4$. The sides of ore-bed may be parallel, convergent, or divergent, as shown. If parallel, the depth of the pulverized ore thereon will be reduced from head to tail in proportion to the amount of material drawn off through the discharge slots, ways, or openings $e^{18}$. If convergent, the depth may be retained or increased. If divergent, it will be diminished to a considerable extent. Any desired number of these compartment-boxes may be taken to form the compound ore-bed E, being secured in a suitable manner to the side pieces $e$, (see Figs. 1, 2, 6, and 7,) which have openings corresponding to the various ports $e^7$ and $e^8$ of the said boxes. Covering these ports and secured to the side pieces $e$ are the air boxes or conduits $e'$ $e'$ upon each side of the bed, which conduct the air impulses from the bellows to the various air-compartments of the ore-bed through the ports $e^7$ and $e^8$. The sum of the areas of these ports $e^7$ and $e^8$ should equal the area of the cross-section of the conduit $e'$ at $o$ (see Fig 5) to equalize the division of the air impulses among the various air-chambers of the ore-bed, or any familiar form of adjustable gate may be used at each port for the same purpose, if preferred. Strips $e^{16}$ (see Figs. 2, 6, and 7) cover the wooden end plates of the compartment-boxes, preventing a dead-surface on the ore-bed and acting as guides along the edges of the mass of pulverized ore under treatment. A hopper H is secured to the side plates $e$ and the upper side of the first concentrator-box of the compound ore-bed, (which upper side of said first box may be made of wood, as there is no discharge-opening for concentrates there,) and said hopper is provided with a feed-gate $h$, adjusted to and held in position by the thumb-screw $h'$.

The ore-bed is supported at three points, two at the inner and one at the outer end, viz: upon pivots $o^5$, (see Figs. 1 and 2,) projecting from plates secured upon the air-conduits $e'$ $e'$, which rest in the semicircular recesses in the outer ends of the plates $o^6$, which plates are bolted to the bellows at $o^7$ $o^7$ and carry at the inner ends the pivot $s$, upon which the beater oscillates. The outer end of the ore-bed rests upon a thumb-screw $o^3$, by means of which it can be vertically adjusted to vary the pitch or incline of the surface $e^2$ of the ore-bed E. To permit of such vertical adjustment without interfering with the passage of the air impulses, the inner ends of the conduits or air-boxes $e'$ are made convex, as shown at $o$, (see Fig. 1,) upon a circle having the pivot $o^5$ for its center, and the corresponding inner end of the bellows is made concave upon a circle having the same center, and the joint thus formed at $o$ is packed with any suitable material. To hold this joint tight, the thumb-screw $o'$ is provided, pressing against the (inclined upper surfaced) end block $e^{15}$, over which the tailings are discharged. Therefore to change the pitch of the ore-bed it is only necessary to first release the screw $o'$; second, adjust pitch with screw $o^3$, and, third, retighten joint $o$ with screw $o'$. The openings $e^7$ and $e^8$ from the conduit $e'$ to the chambers $e^4$ alternate on each side of the ore-bed, as shown in Fig. 6. The discharge ways or slots $e^{18}$, Figs. 2, 5, 6, and 8, cross the bed laterally from plate $e$ to plate $e$, and are provided with fillers $e^{19}$, (see Figs. 5 and 7,) flush with strips $e^{16}$ and the end plates of the boxes $e^{17}$ from top to bottom of the slots for the purpose of limiting the length of the slots $e^{18}$ to the width of the active surface of the ore-bed—to wit, the space between the covers or guide-strips $e^{16}$. Curved pieces of wire-gauze or sheet metal $e^{11}$, Figs. 6 and 8, cross the surface of the bed laterally, their lower edges in contact with the tail sides of the top of the slots or openings $e^{18}$, and whose upper edges are projected upward and inward against the flow of the pulverized ore sufficiently to cover or a little more than cover the tops of the openings $e^{18}$, but leaving sufficient opening under their upper and inwardly-projecting edges to permit the bottom stratum on the surface of the bed $e^2$ to find its way easily thereunder and into the top of the slot $e^{18}$. These curved strips are secured at each end to the side guide-plates $e^{16}$ and may be secured in any suitable manner to the lower (or outer or tail) side of the upper ends (or tops) of openings $e^{18}$, care being taken not to choke the slot $e^{18}$ in so doing; or in lieu of curved pieces of wire-gauze $e^{11}$, having their lower edges in contact with the tail side of the top of the slot $e^{18}$, bars or rods, of any form which will divide the substratum from the superstratum at a point directly over the openings $e^{18}$ to prevent the downward flow of the superstratum at said point and prevent the formation of a downward draft on the superstratum when the substratum is drawn off, may be used. The purpose of these curved strips, bars, or rods is to promote the withdrawal of the bottom or heaviest stratum into and through the openings $e^{18}$ and to prevent the formation thereover of a vortex, which always draws from the surface or superstratum, no other causes interfering. I do not limit myself to the construction shown for the prevention of the formation of vortices, as strips, bars, or rods of various forms may be suitably arranged or interposed to obstruct the flow from the upper stratum.

I will next describe the fourth principal part of the device, which consists of mechanism designed, while it keeps the discharge ways or slots $e^{18}$ always full, yet to remove their contents at such rate as the operator chooses, which should be just so fast and no faster than the concentrates accumulate and form into a lower or bottom stratum on the surface $e^2$ of the ore-bed and enter the top of the slot $e^{18}$ without bringing foreign matter with them. For the sake of brevity, and for want of a more euphonious expression, I will call this mechanism the "take-off." It consists of plates $t$ of the proportionate length shown in Fig. 7 and width shown in Fig. 8, a portion of the ends of which is preferably turned down at right angles and secured at each end at $t^3$ (see Fig. 8) to the upwardly-projecting rocker-arms $t^2$, which arms are secured to the rock-shafts $t^4$ in the pierced hangers of the hanger-plates $t^7$. (See Fig. 7.) These rock-shafts $t^4$ have downwardly-projecting arms at one end, (see Fig. 1,) slotted at $t^6$ for adjustable connection with the connecting-bar $t^8$, which also has slotted openings $t^9$ for the connecting-screw pins $t^{12}$. This connecting-bar $t^8$ has movable connection by the pin $t^{11}$ with the pitman $t^{10}$, which is actuated by an adjustable throw-crank $t^{13}$ (see Figs. 2 and 5) on the end of a short shaft $w^6$, which is rotated by means of a ratchet-wheel $W^2$, acted upon by the pawl $w$, the reverse motion of ratchet-wheel $W^2$ being prevented by the small pawl $w'$. This pawl receives its positive movement from a crank $w^4$, turned in the main shaft of the machine, and its retrograde movement from the spiral spring $w^2$, coiled thereon, which bears at stationary end against the timber $b$ of the frame (through which the pawl passes) and at its movable or operative end against the shoulder $w^5$ of the jaw $w^3$ of the pawl $w$, which has an open semicircular end to fit the crank $w^4$. W indicates a power-pulley on the main shaft of the machine, and W' a fly-wheel at the opposite end of said main shaft. Divider-strips $t'$, set edgewise in the center of the bottom of the transverse openings $e^{18}$, Fig. 8, and secured at each end at $t^{15}$ to the hanger-plates $t^7$, (see Fig. 7,) their upper edges entering the slots $e^{18}$ and their lower edges slightly above and out of contact with the plates $t$, are introduced for the purpose of insuring the flow of the concentrates down through the openings $e^{18}$ and off the edges alternately of the plates $t$.

Referring to the foregoing description of the mechanism actuating the plates $t$, it is apparent that with the connecting-bar $t^8$, secured to the arms $t^5$ in the position shown in Fig. 1 of the drawings, the movement of the innermost plate $t$ would be greater than its next neighbor, and so on to the outermost, which would have the least movement of all. As these plates have no oscillatory movement from side to side, it follows that the material filling the slots $e^{18}$ and resting upon them will be drawn slowly off thereby in the following manner: Supposing, for illustration, that the first movement of a given plate is one-eighth of an inch to the right, then the material on said plate located on the right-hand side of the divider-plate $t'$ will ride or be carried out thereon from the right-hand side of the slot $e^{18}$, there being nothing opposed directly to such action; but the material on the left-hand side of the divider-plate $t'$ will be opposed by said divider-plate $t'$ and the plate $t$ will slide thereunder. On a reverse movement of, say, one-eighth of an inch to the left the material on the left-hand side of the divider-plate $t'$ will be carried to the left, while that to the right will remain stationary. If these movements be continued, a portion relative to the stroke of the plate $t$ will be dropped alternately from each edge thereof, and the action down through the slot $e^{18}$ will be intermittent, thus giving sufficient time after each down-flow of concentrates for another accumulation above the curved strips $e^{11}$ on the surface $e^2$ of the ore-bed to prevent to that extent the drawing of extraneous or worthless gangue matter down through the discharge-openings $e^{18}$ intended for the concentrates.

In operation the heaviest matter will pass through the first opening $e^{18}$ it encounters in passing over the bed from head to tail, and so on to the last opening $e^{18}$, which will discharge that material which is the nearest in specific gravity to the refuse or gangue. In practice all the movements of the ore from beginning to ending being done by machinery and automatically it would conduce to the greatest saving (where several concentrators are in simultaneous use upon the different grades as to size of ore) to draw a pretty large percentage of gangue through the last opening $e^{18}$ and return the whole of the product of this last opening to the hopper of the next succeeding machine, by which I mean the machine working the next smaller grade of material. These concentrates discharged from the last slot $e^{18}$ of No. 1 concentrator (working the coarsest material) would be discharged substantially pure from one of the slots $e^{18}$ near the head of No. 2 concentrator working the next smaller grade of material, and the same principle of operation should be applied to all the machines in the group until the last working the finest material, when the material from the last slot $e^{18}$ of the last concentrator may be either returned to the hopper of the said last machine which produced it or the take-off adjusted to draw as pure a product as is consistent with good work and allow this to go with the other concentrates at the discretion of the operator, who, it is to be presupposed, will have some knowledge of the business. Supposing a mixture of nearly equal-sized particles of galena, (specific gravity about 7.6°) of pyrites, (specific gravity about 4.8°,) and of quartz (specific gravity about 2.6°) containing a large percentage of free gold particles (of a specific gravity anywhere of from 15° to 19°) were passed over one of these machines, it would be possible by proper adjustment to draw nearly all the gold with a little galena through the first slot of the series, nearly-pure galena through the next, then a mixture of galena and pyrites, then nearly-pure pyrites, then a mixture of pyrites with more or less quartz, (at will,) and finally to discharge nearly-pure quartz at the tail, carrying only a very small percentage of the value originally contained in the mass as fed into the machine. Finally, it will be noted that the forces which act to produce flow in this device are alternately the force of the impulses and the force of gravity, the force of the impulses acting obliquely upward in lines at or nearly at right angles with the face of the bed and the force of gravity perpendicularly downward, the two combined resulting in a series of steps from the head toward the tail of the machine or of the compound ore-bed.

The described means for producing stratification by means of impulses produced by concussion, with the means for modifying the same and the described means for withdrawing the substratum of concentrates and at the same time preventing the formation of vortices in the superstratum of gangue, as well as the escape or egress of the stratifying agent (air or water) with the concentrates, (which escape would interfere with stratification,) are the great central features of this device, to which all others are subservient and tributary. Having therefore provided a variety of means for modifying the process of stratification and a variety of means for modifying the process of drawing off the substratum of concentrates without withdrawing therewith the superstratum of gangue or interfering with the process of stratification, I do not limit myself to the particular construction shown. For instance, a beater might be arranged upon an elastic or spring handle operated by a cam or in the same manner as a steam-hammer, with valves and mechanism to cause it to deliver any sort of blow desired; also a fluted roller operated by a ratchet-wheel might be substituted for the take-off mechanism shown. Furthermore, an air or a water chamber having one side constructed of leather or india-rubber might be substituted for the bellows shown, &c. It should also be understood that a pumping or a tremolo effect may be produced by means of the bellows by turning the screw $s^{20}$ down into continuous contact with the beater-handle, so as to eliminate all free movement of the beater, which adjustment reduces it to a crank movement that may be found suitable to some varieties or sizes of ore.

For purposes of illustration and because an air or dry concentrator has the widest range of usefulness, I have chosen a dry concentrator for purposes of this description; but it will be evident to those skilled in the art that the same principles of construction, combination, and operation can be applied to wet concentrators without further invention, and I intend that the claims hereinafter made shall apply equally to wet concentrators.

Stratification by modified concussion is the great central feature in this device, to which all others are subservient and tributary.

Having thus described my invention, what I claim, and desire to secure by Letters Patent, is—

1. In a concentrator, the combination of an ore-bed, a bellows, and a beater for actuating the bellows, substantially as and for the purposes specified.

2. In a concentrator, the combination of an ore-bed, a bellows, a beater for actuating the bellows, and an elastic anvil interposed between the bellows and beater, substantially as and for the purposes specified.

3. In a concentrator, the combination of an ore-bed, a bellows, a beater, and an adjustable weight arranged on the beater to control the momentum thereof, substantially as and for the purposes specified.

4. In a concentrator, the combination of an ore-bed, a bellows, a beater for actuating the bellows, an adjustable weight arranged on the beater, and an elastic anvil interposed between the bellows and beater, substantially as and for the purposes specified.

5. In a concentrator, the combination of an ore-bed, a bellows, a beater for actuating the bellows, a strap or yoke connected with the bellows and encircling the beater, and a thumb-screw to control the movement of the beater, substantially as and for the purposes specified.

6. In a concentrator, the combination of an ore-bed, a bellows, a beater for actuating the bellows, a strap or yoke connected with the bellows and encircling the beater, a thumb-screw for controlling the movement of the beater, and an elastic anvil interposed between the beater and the bellows, substantially as and for the purposes specified.

7. In a concentrator, the combination of an ore-bed, a bellows, a beater for actuating the bellows, an adjustable weight arranged on the beater, a strap or yoke connected with the bellows and encircling the beater, and a thumb-screw for controlling the movement of the beater, substantially as and for the purposes specified.

8. In a concentrator, the combination of an ore-bed, a bellows, a beater for actuating the bellows, an adjustable weight arranged on the beater, a strap or yoke connected with the bellows and encircling the beater, a thumb-screw for controlling the movement of the beater, and an elastic anvil interposed between the beater and the bellows, substantially as and for the purposes specified.

9. In a concentrator, the combination of an ore-bed, a bellows, a beater for actuating the bellows, and an adjustable crank for changing the throw of the beater, substantially as and for the purposes specified.

10. In a concentrator, the combination of an ore-bed, a bellows, a beater for actuating the bellows, a sliding clamp arranged on the beater, and a rock-shaft and spring-arm for actuating the beater, substantially as and for the purposes specified.

11. In a concentrator, the combination of an ore-bed, a bellows, a beater for actuating the bellows, a sliding clamp arranged on the beater, a rock-shaft with spring-arm for actuating the beater, and an adjustable crank for changing the throw of the beater, substantially as and for the purposes specified.

12. In a concentrator, the combination, with an ore-bed having one or more discharge slots or ways extending downward from said bed for withdrawing the substratum of concentrates, of obstructive pieces arranged over said discharge ways or slots to prevent the formation of vortices over said discharge-slots, and means for producing stratification on said ore-bed, substantially as and for the purposes specified.

13. In a concentrator, the combination, with an ore-bed having a discharge-way for concentrates, of a concentrate-discharger arranged at the exit of said discharge-way, and mechanism for automatically actuating said discharger, whereby the discharge-way may be kept full of concentrates to prevent the escape of the stratifying medium through said discharge-way, substantially as specified.

14. In a concentrator, the combination, with an ore-bed having one or more discharge-ways for concentrates, and means for producing stratification on said bed, of oscillating plates arranged at the exits of said ways to prevent flow therethrough when at rest, and mechanism to automatically oscillate said plates to remove the contents of said discharge-ways, substantially as and for the purposes specified.

15. In a concentrator, the combination, with an ore-bed having one or more discharge-ways for concentrates, and means for producing stratification on said bed, of oscillating plates arranged at the exits of said ways, stationary plates arranged in said ways to coact with the oscillating plates in promoting a measured rate of discharge, and mechanism for automatically actuating said oscillating plates, substantially as and for the purposes specified.

16. In a concentrator, the combination, with an ore-bed having one or more discharge-ways for concentrates, and means for producing stratification on said bed, of obstructive pieces arranged over said ways, and oscillating plates arranged at the exits of said ways to regulate the discharge of concentrates, substantially as and for the purposes specified.

17. In a concentrator, the combination, with an ore-bed having one or more discharge-ways for concentrates, and means for producing stratification on said bed, of obstructive pieces arranged over said ways, dischargers arranged at the exits of said ways, and mechanism for automatically actuating said dischargers for discharging the concentrates in measured and regulated quantities, substantially as specified.

18. In a concentrator, the combination, with an ore-bed having one or more discharge-ways for concentrates, and means for producing stratification on said bed, of obstructive pieces arranged over said ways, stationary plates arranged in said ways to assist in producing a measured rate of discharge, oscillating plates arranged at the exits of said ways, and mechanism for automatically actuating said oscillating plates to discharge the concentrates at a measured rate, whereby said discharge-ways may be kept always full to prevent such escape of the stratifying-fluid through said ways as would impair the process of stratification on the surface of the ore-bed, substantially as and for the purposes specified.

In testimony whereof I affix my signature, in presence of two witnesses, this 27th day of June, 1890.

WILLIAM L. CARD.

Witnesses:
 F. S. CARD,
 T. P. BARNETT.